United States Patent
Abraham et al.

(10) Patent No.: US 7,747,797 B2
(45) Date of Patent: Jun. 29, 2010

(54) MASS STORAGE DEVICE WITH NEAR FIELD COMMUNICATIONS

(75) Inventors: Dalen M. Abraham, Duvall, WA (US); Scott A. Manchester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 11/192,291

(22) Filed: Jul. 29, 2005

(65) Prior Publication Data

US 2006/0069814 A1   Mar. 30, 2006

Related U.S. Application Data

(63) Continuation-in-part of application No. 10/951,547, filed on Sep. 28, 2004, now abandoned.

(51) Int. Cl.
G06F 3/00 (2006.01)
G06F 15/16 (2006.01)

(52) U.S. Cl. ............... 710/62; 710/11; 710/16; 710/36; 719/321; 709/230

(58) Field of Classification Search ........................ None
See application file for complete search history.

(56) References Cited

U.S. PATENT DOCUMENTS

| | | | |
|---|---|---|---|
| 4,102,493 A | 7/1978 | Moreno | |
| 4,783,766 A | 11/1988 | Samachisa et al. | |
| 4,805,222 A | 2/1989 | Young et al. | |
| 4,970,692 A | 11/1990 | Ali et al. | |
| 5,557,124 A | 9/1996 | Roy et al. | |
| 5,966,082 A * | 10/1999 | Cofino et al. | 340/10.51 |
| 6,011,724 A | 1/2000 | Brigati et al. | |
| 6,324,537 B1 | 11/2001 | Moran et al. | |
| 6,539,380 B1 | 3/2003 | Moran et al. | |
| 6,667,906 B2 * | 12/2003 | Park et al. | 365/185.18 |
| 6,885,585 B2 | 4/2005 | Maayan et al. | |
| 6,922,734 B2 * | 7/2005 | Teicher | 710/1 |
| 7,177,957 B2 * | 2/2007 | Vance | 710/13 |
| 2001/0029607 A1 * | 10/2001 | Veres et al. | 717/11 |
| 2002/0112058 A1 | 8/2002 | Weisman et al. | |
| 2003/0046554 A1 | 3/2003 | Leydier et al. | |
| 2003/0055892 A1 | 3/2003 | Huitema et al. | |
| 2003/0167376 A1 | 9/2003 | Koh | |
| 2004/0038592 A1 | 2/2004 | Yang | |
| 2004/0059925 A1 | 3/2004 | Benhammou et al. | |

(Continued)

OTHER PUBLICATIONS webopedia, EEPROM, http://www.webopedia.com/TERM/E/EEPROM.html.*

(Continued)

*Primary Examiner*—Alan Chen
(74) *Attorney, Agent, or Firm*—Marshall, Gerstein & Borun LLP

(57) ABSTRACT

A memory device may comprise a nonvolatile computer readable medium, a near field communication wireless transmitter, a nonvolatile near field communication tag memory, a data input device and a controller. The nonvolatile computer readable medium is adapted to store data in a data block format. The near field communication wireless transmitter is adapted to wireless transmit data to an external near field communication receiver. The nonvolatile near field communication tag memory is adapted to store data in a tag memory format.

19 Claims, 11 Drawing Sheets

U.S. PATENT DOCUMENTS

| | | | |
|---|---|---|---|
| 2004/0100834 A1* | 5/2004 | Waters | 365/200 |
| 2004/0103288 A1* | 5/2004 | Ziv et al. | 713/185 |
| 2004/0148333 A1 | 7/2004 | Manion et al. | |
| 2005/0004916 A1 | 1/2005 | Miller et al. | |
| 2005/0109841 A1* | 5/2005 | Ryan et al. | 235/380 |
| 2005/0149204 A1 | 7/2005 | Manchester et al. | |
| 2005/0198233 A1 | 9/2005 | Manchester et al. | |
| 2006/0069814 A1 | 3/2006 | Abraham et al. | |
| 2006/0069840 A1 | 3/2006 | Corbett et al. | |
| 2006/0101456 A1 | 5/2006 | Crosier et al. | |
| 2006/0279412 A1* | 12/2006 | Holland et al. | 340/10.51 |
| 2006/0283930 A1 | 12/2006 | Shafer et al. | |
| 2006/0289639 A1 | 12/2006 | Shafer et al. | |
| 2006/0289646 A1 | 12/2006 | Shafer et al. | |
| 2006/0289647 A1 | 12/2006 | Shafer et al. | |
| 2006/0289648 A1 | 12/2006 | Shafer et al. | |

OTHER PUBLICATIONS

Box, D., "Code Name Indigo: A Guide to Developing and Running Connected Systems with Indigo," Microsoft Corporation 2005, http://msdn.microsoft.com/msdnmag/issues/04/01/indigo/?print=true, 11 pages.

Chappell, D., "Introducing Indigo: An Early Look," Microsoft Corporation 2005, http://msdn.microsoft.com/library/en-us/dnlong/html/introindigov1-0.asp?frame=true, 18 pages.

Draves. F., Default Address Selection for Internet Protocol Version 6 (IPv6), The Internet Society 2003, http://www.ietf.org/rfc/rfc3484.txt.

$21^{st}$ Century Locks Fingerprint Locks, http;//www.21stcenturylocks.com/outbacker.htm, pp. 1-4.

Biometric Drives Featured Products, http://www.cpustuff.com/flashdrive.html, pp. 1-3.

Biometric External Devices Featured Products, http://www.cpustuff.com/biometric_external.htm, pp. 1-3.

Creative Nomad MuVo NX, Features and Benefits, http://nomadworld.com/products/muvo_nx/features.asp, pp. 1-2.

Gemplus, GemClub-Memo, http://ww.gemplus.com/products/gemclub_memo/, pp. 1-3.

Gemplus, Chipware, http://ww.gemplus.com/techno/chipware/indes.html, pp. 1-2.

Gemplus, GPM8K, http://www.gemplus.com/products/gpm8k/indes.html, pp. 1-2.

Trekstor USA, Thumbdrive (TM) Secure details, http://www.trektorusa.com/Thumbdrive_secure.htm, pp. 1-2.

USB Flash Drive FAQ, http://usbflashdrive.org/usbfd_faq.html, pp. 1-6.

Merriam-Webster OnLine Dictionary www.merriam-webster.com/dictionary/biometrics.

Xreferplus, Webster's New World Computer Dictionary, 2003, Wiley Publishing, Inc. "biometric authentication" www.xreferplus.com.

\* cited by examiner

MASS STORAGE DEVICE WITH NEAR FIELD COMMUNICATIONS

CROSS REFERENCE TO RELATED APPLICATIONS

This application is a continuation-in-part of U.S. application Ser. No. 10/951,547 entitled "Universal Serial USB Device," filed Sep. 28, 2004 now abandoned, the contents of which are expressly incorporated by reference herein.

BACKGROUND

A Universal Serial Bus ("USB") is an external bus that supports plug and play installation. Using a USB port of a computer system, a user may connect and disconnect devices without shutting down or restarting the computer. A single USB port may connect multiple peripheral devices, including speakers, telephones, CD-ROM drives, joysticks, tape drives, keyboards, scanners, memory drives, and cameras, such as through daisy chaining the peripheral devices into one port of the computer system.

Flash memory is a type of nonvolatile computer readable medium, similar to EEPROM memory in function, but may be erased in blocks. Because of its block-oriented nature, flash memory is typically used as a supplement to or replacement for hard disks in portable computers. In this context, flash memory is typically built into the unit, available as a PC Card that can be plugged into a PCMCIA slot, or available as a USB device compatible with a USB port.

A Radio Frequency Identification (RFID) tag is a type of near field communication medium that includes a transponder, a nonvolatile tag memory and a processor. The transponder may include a transmitter and a receiver. When the RFID tag is placed in proximity with a near field communication reader/receiver, the RFID tag will automatically transmit data stored in the tag memory upon detection of the reader/receiver. The RFID tag may also receive data from an RFID transmitter/writer and store the data in binary format in the tag memory.

SUMMARY

The following presents a simplified summary of the disclosure in order to provide a basic understanding to the reader. This summary is not an exhaustive or limiting overview of the disclosure. The summary is not provided to identify key and/or critical elements of the invention, delineate the scope of the invention, or limit the scope of the invention in any way. Its sole purpose is to present some of the concepts disclosed in a simplified form, as an introduction to the more detailed description that is presented later.

Memory devices, such as USB flash drives are typically used to store data in a nonvolatile computer readable medium when it is physically connected to a USB port of a computer system. Because a USB flash drive is portable, e.g., removable from the computer system USB port, a USB flash drive may transfer data to another computer system when it is attached to the USB port of another computer system. However, not all devices have a USB port. To transfer stored data to an external device not compatible with the USB protocol, the USB flash drive may include a near field communication transmitter capable of wirelessly transmitting data from the USB flash drive directly to an external near field communication device. In order to control the transfer of data to an external near field communication device, the memory device may include one or more data input devices to control the transfer of data.

USB flash drives may also include a computer readable medium, such as flash memory, and a near field communication tag memory. However, because data stored in flash memory is stored in blocks which may be incompatible with tag memory format, the memory device may translate the data from data block format to tag memory format to be exchanged with the external near field communication device. Likewise, the memory device may translate data from tag memory format to data block format for external devices that may not be compatible with near field communications.

Further, the memory may be partitioned into public and private partitions. The public partition may be accessible through normal channels of access. In some cases, the private partition may be accessed only through authentication of a credential provided by the user or computer system. Only users or systems providing a valid credential may access data stored in the private partition. The credential may be received by a decision component of the memory device to authenticate the credential and allow access to the private partition.

Using the USB device, network settings for a wireless network may be shared among different devices to be included in the network. Network settings are received by the USB device from a first device, such as a host computer. The network settings are stored in the nonvolatile computer readable medium and wirelessly transmitted to a second device. In some cases, the network settings are transmitted to and stored in an extensible markup language (XML) format. If necessary, the USB device translates the XML format to binary format when transmitting the settings to the second device. The USB device may further edit the network settings depending on the capacity of the computer readable medium.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1A:
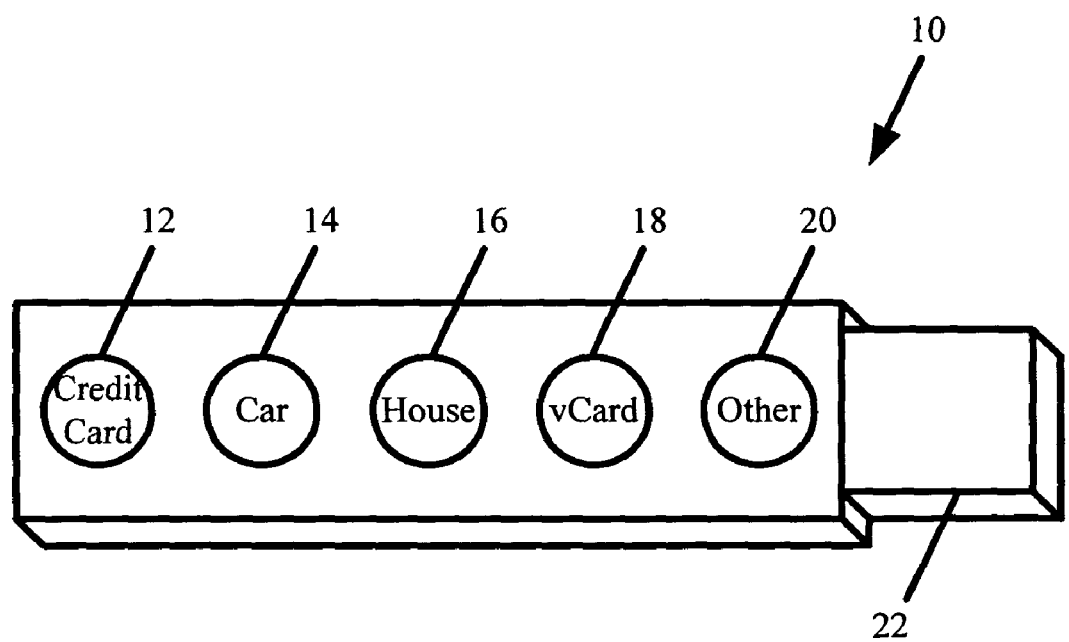
FIGS. 1A and 1B are a perspective views of an example of a memory device in accordance with the claims.
Figure 1B:
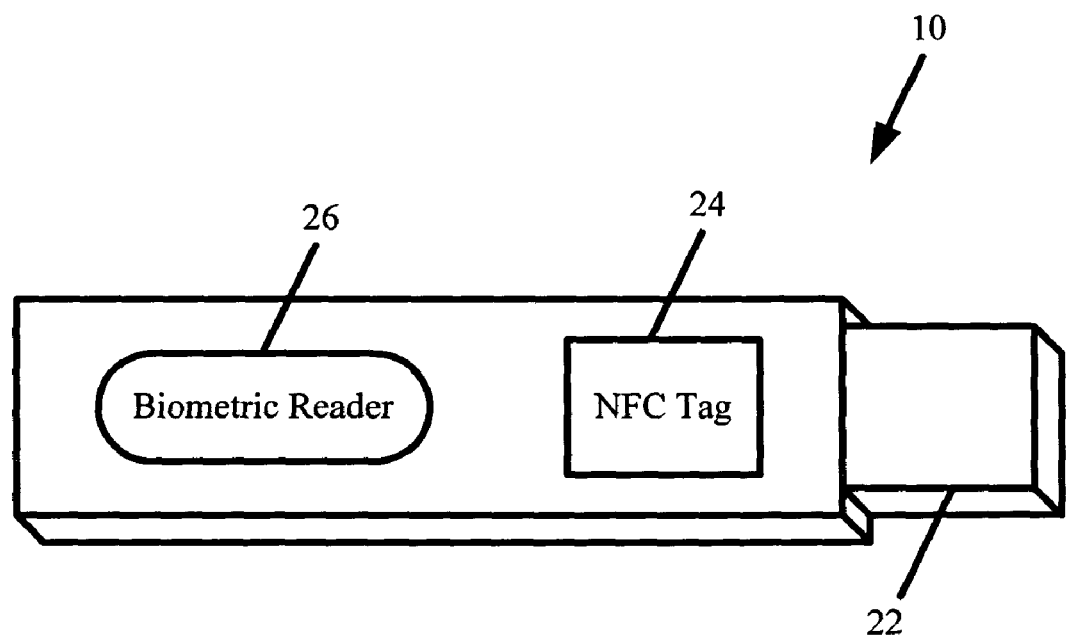

FIGS. 1A and 1B illustrate an example of a memory device 10, such as a USB flash drive. As shown in FIG. 1A, the memory device 10 includes one or more data input devices and a USB connector 22. Each data input device may be provided as a button, and each of the buttons 12, 14, 16, 18, 20 may be associated with a different data component stored within the memory device 10. For example, a "Credit Card" button 12 may be associated with a credit card number, expiration date and card holder name. A "Car" button 14 may be associated with a car entry code. A "House" button 16 may be associated with a house entry code. A "vCard" button 18 may be associated with business card information. Additional buttons, such as an "Other" button 20 may be associated with additional data components as specified by a user. Additional examples of a data input device include an alphanumeric key pad, a selector wheel with different wheel positions corresponding to the different data components, a microphone and voice recognition with different phrases corresponding to the different data components, and the like.

As shown in FIG. 1B, the memory device 10 also includes a near field communication tag 24, such as a Radio Frequency Identification (RFID) tag, and a biometric reader 24. The near field communication tag 24 may include a Radio Frequency Identification (RFID) tag. Other suitable near field communication tags may support radio frequency, acoustic, ultraviolet, optical, and the like. Other near field communication types may be suitable including magnetic field and any other wireless media. The transmission of the data may be governed by any appropriate protocol, such as the radio frequency identification protocols, and the like. The biometric reader 24 may include any appropriate biometric reader such as a fingerprint scanner, an optical scanner, a voice recognition system, etc. As explained further below, the biometric reader 26 may provide restricted access to all or part of the data stored in the memory device 10, wherein access is restricted only to a user(s) with appropriate biometric credentials. In another example, the memory device 10 may be provided without the biometric reader 26, and access is restricted by a code or password to be entered via the buttons 12, 14, 16, 18, 20 or other data input device.

Transfer of the various data components from the memory device 10 to an external device may be initiated through selection of the one or more data input devices resulting in the memory device 10 transmitting the corresponding data component. For example, when placed in proximity with an external near field communication receiver/reader, the selection of one of the buttons 12, 14, 16, 18, 20 may cause the corresponding data component to be transmitted to the external device. The memory device 10 may also receive data when placed in proximity with an external near field communication transmitter/writer, and selection of one or more of the data input devices may initiate reception and storage of the data as a data component corresponding to the data input device. In one example, the user may be prompted via a speaker, light emitting diode (LED) or the like when the memory device 10 is in suitable proximity with the external device to initiate transfer of data. In another example, the memory device 10 may automatically initiate transmission and/or reception of all or part of the data when placed in proximity with the external device.

Figure 2:
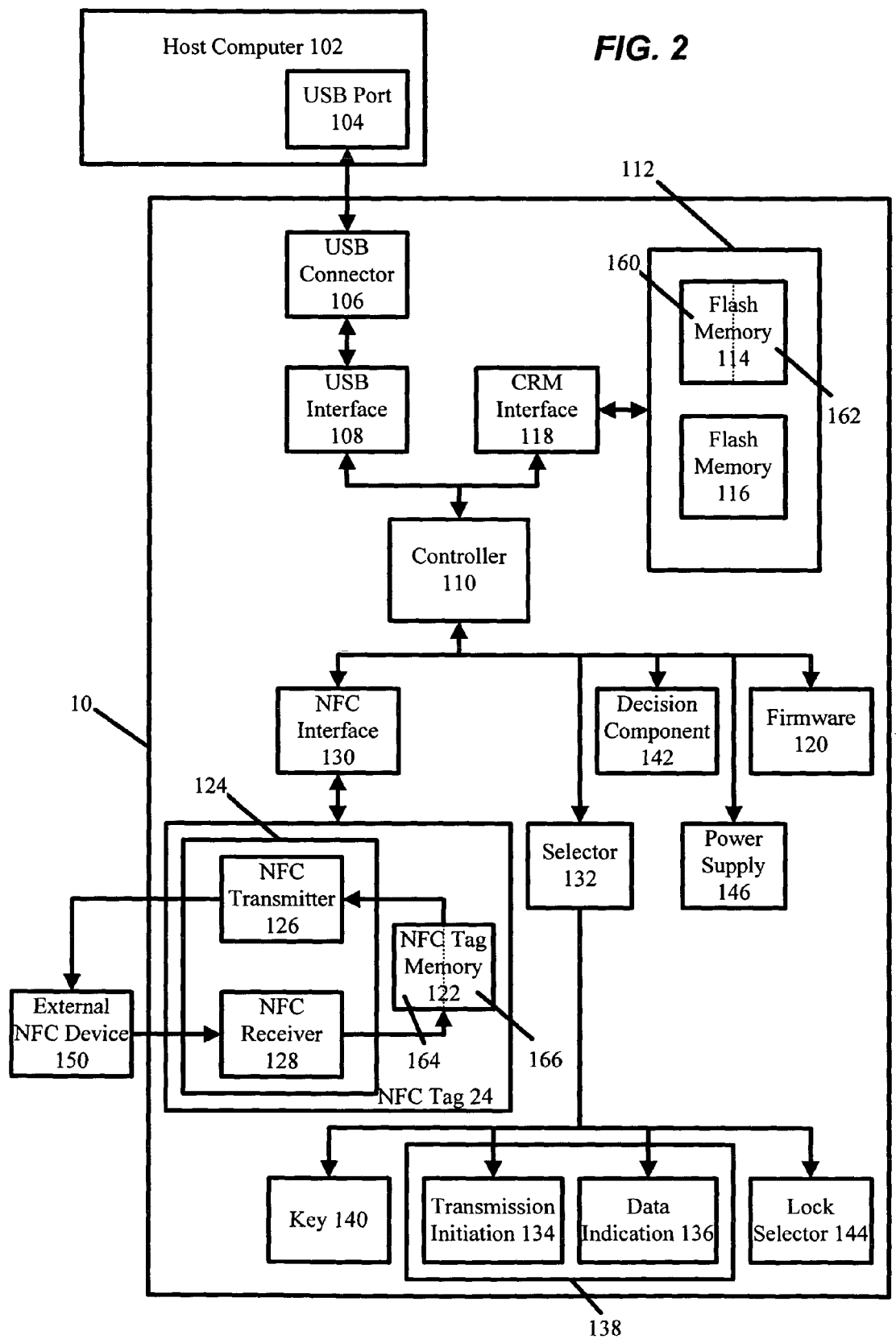
FIG. 2 is a schematic illustration of an example memory device in accordance with the claims.

FIG. 2 illustrates an example of components of a memory device 10. As shown in FIG. 2, the memory device 10 may be connected to a host computer system 102 through a physical connection of the USB connector 106 of the memory device 10 into the USB port 104 of the host computer system 102. The USB connector 106 may be any suitable USB connector including a Type A USB connector, a Type B USB connector, and a mini-USB connector. As shown in FIG. 2, the USB connector 106 may be in communication with a USB interface 108 of a controller 110. The memory device 10 may include a nonvolatile computer readable medium 112 which may include one or more flash memories 114, 116, or other mass storage device, which may be controlled by the controller 110 through the nonvolatile computer readable medium interface 118. The controller 110 may also access appropriate firmware 120 such as an operating system to control the operation and function of the USB connector and the nonvolatile computer readable medium. The controller 110 may be any suitable controller including a processor, a special purpose state device, or any other appropriate controller.

A computer system may access the data stored in the nonvolatile medium 112 through a physical connection and communication between a host system USB port 104 and the USB connector 106 of the memory device 10. However, a user may desire to transfer data to and from another device without a USB port. Accordingly, the memory device 10 includes the near field communication tag 24. The near field communication tag 24 includes a nonvolatile near field communication tag memory 122 and a near field communication wireless transponder 124. The near field communication tag memory 122 may generally store small amounts of data as compared to the nonvolatile computer readable medium 112. Although the capacity of the nonvolatile computer readable medium 112 and the near field communication tag memory 122 may vary, the capacity for the near field communication tag memory is generally on the order of tens or hundreds of kilobytes, whereas capacity for the nonvolatile computer readable medium 112 is generally on the order of several megabytes or gigabytes.

The near field communication wireless transponder 124 includes a near field wireless transmitter 126 and a near field wireless receiver 128. The near field communication wireless transmitter 126 may be any suitable component for wirelessly transmitting data from the computer readable medium 112 to an external device 150. The external device 150 may be a near field communication compatible device which includes a near field communication receiver/reader, and may further include a near field communication transmitter/writer for transmitting data to the near field communication transponder 124.

The near field communication wireless transponder 124 and its components 126, 128 may be controlled by the controller 110 via a near field communication interface 130 as shown in FIG. 2. However, in one example, the near field communication tag 24 may include a near field communication controller including a processor, a special purpose state device, or any other appropriate controller, in addition to the controller 110. The near field communication controller may be provided as the near field communication transponder 124, such that the transponder 124, and/or its components 126, 128, control the transmission of data between the external near field communication wireless device 150, the computer readable medium 112 and/or the near field communication tag memory 122. In yet another example, the near field communication tag 24 may be provided without the near field communication receiver 128.

The transponder 124 may transmit compressed data. For example, the data from the computer readable medium 112 and/or the near field communication tag memory 24 may be stored in a compressed format and/or compressed by the controller, e.g., compressed by any suitable method to decrease the amount of memory and/or bandwidth. Compressed data may be expanded by any suitable method to allow the data to be used and/or accessed for its intended purpose or function.

The transponder 124 may transmit and/or receive a modulated data signal between the memory device 10 and the external near field communication wireless device 150. The transponder 124 may directly transmit and receive data when placed in proximity to the external near field communication wireless device 150. As used herein, 'directly transmitting' means that the data is transmitted from the memory device 10 to another device 150 without any intervening host computer system and without peripheral communication wires, e.g., wireless communications. Likewise, 'directly receiving' means that the data is transmitted to the memory device 10 from the external near field communication device 150 without any intervening host computer system and without peripheral communication wires. In this manner, data may be transferred directly to and from the memory device to the external device, without any intervention by the host computer system 102 connected to the USB connector 106 of the memory device 10. In another example of direct transmission, the transponder 124 may send a modulated data signal with the data encoded onto the modulated data signal. In one example, the transponder may include a radio frequency transponder such as a Radio Frequency Identification transponder similar to those used on RFID tags. Other suitable near field communication transponders may support radio frequency, acoustic, ultraviolet, optical, and the like. Other transponder types may be suitable including magnetic field data transponders and any other wireless media. The transmission of the data may be governed by any appropriate protocol, such as the radio frequency identification protocols, and the like.

Transfer of data from the nonvolatile computer readable medium 112 and/or the nonvolatile near field communication tag memory to the external device 150 through the near field communication transponder 124 may be initiated by any appropriate method or device. In one example, the user may provide a transmission initiation indication through the host computer system to initiate transmission of data to an external device. More particularly, a client driver (not shown) of the host computer system 102 may provide a dialog, menu, displayed button, or other appropriate user interface or data input device which allows a user to initiate transfer of data. The host computer system may communicate the transmission initiation indication to the USB flash drive through the USB connection. In response to the transmission initiation indication, the transponder 124 may transmit data to the external device 150.

In an other example, transfer of data through the transponder 124 may be initiated through selection of one or more data input devices, such as a selector 132 of the memory device 10. For example, as shown in FIG. 2, the memory device 10 may include a transmission initiation selector 134, such as the buttons 12, 14, 16, 18, 20, a selector wheel, and the like. Upon selection of the transmission initiation selector 134, the near field communication wireless transponder 124 may transmit all or a portion of the data stored in the computer readable medium 112 and/or the near field communication tag memory 122 to the external device 150. In another example, proximity of the external device 150 to the transponder 124 may automatically initiate transmission. In some cases it may be suitable for each device, i.e., the memory device 10 and the external device 150, to automatically exchange information when in proximity such that transmission and reception of data is automatically initiated. In other cases, it may suitable for the memory device 10 and/or external device 150 to include a transmission direction selector such as an arrow, selector, switch, and the like to indicate the data flow to be used if transmission is initiated. More particularly, the memory device 10 may include one or more selectors 132, to indicate whether the USB flash drive is the 'transmitter' of data and/or the 'receiver' of data to/from the external device 150. In other cases, a default device may be predetermined as the sender and/or receiver of data. For example, the device having the USB connector connected to the USB port of another device may be considered the 'transmitter' of data, and the device having the USB port connected to the USB connector may be considered the 'receiver' of data. It is to be appreciated that other suitable default settings and/or selectors may be appropriate.

Any suitable method may be used to determine which portion of the data stored in the nonvolatile computer readable medium may be transmitted. For example, all of the data stored in the nonvolatile computer readable medium 112 and/or the near field communication tag memory 122 may be transmitted upon activation of the transmission initiation selector. In another example, the data portion to be transmitted may be predetermined or pre-set by the user and/or the manufacturer of the memory device 10. For example, the user may indicate the selected portion of data to be transmitted which may be stored in a predetermined partition of the computer readable medium 112, the near field communication tag memory 122 and/or the location for data to be transmitted may be determinable by the controller 110. When transmission is initiated, the controller 110 may send to the transponder 124 the predetermined portion of data.

In another example, a host device 102 may be connected to the memory device 10 through the physical USB connection, allowing a user to access and/or determine the data portions, such as files, documents, executables, memory partitions, and other components available on the computer readable medium 112 and the near field communication tag memory 124 of the memory device 10. In this manner, the host computer system 102 may provide a user interface, such as a dialog, tabular display, and the like, allowing a user to select a particular data portion to be transmitted.

In another example, the memory device 10 may provide a user interface allowing a user to select a portion of data to be transmitted. As shown in FIG. 1A and FIG. 2, the memory device 10 may include one or more selectors 132 allowing a user to select a data portion. Each selector 132 may be associated with a particular data component (e.g., file, executable, data portion, and the like) and/or may be associated with a particular memory partition. For example, the user may associate a particular data file with a data indicator 136 which may be a button 12, 14, 16, 18, 20, wheel selector, alpha-numeric keys, or any other suitable selector of the memory device 10. More particularly, the memory device 10 may include an alpha-numeric keypad, e.g., button '1', button "2", button "3", and button "4" or buttons associated with particular data components, e.g., "Credit Card", "Car", "House", "vCard", "Other". The user may associate selected files and/or memory partitions to particular alpha-numeric keys, e.g., a credit card number may be associated with button "Credit Card", a car entry code may be associated with button "Car", a home entry code may be associated with button "House", and the like. Moreover, a selected data portion may be associated with a particular series, combination, and/or timing of selector initiation. For example, a series selection of button '1' and then button '2' may be associated with a data portion. In another example, a combination of substantially simultaneous activation of button '1' and button '2' may be associated with a data portion. In another example, a timing sequence such as pressing button '1' in a "shave and a haircut two bits" rhythm may be associated with another data portion. In another example, a data indicator 136 may be associated with a plurality of data portions associated in a sequence. In this manner, sequential activations of the data indicator 136 may 'scroll' through the available data portions to indicate the selected data portion to be transmitted. More particularly, a single activation of the data indicator 136 may select a first data portion, a double activation of the data indicator in a predetermined amount of time may select a second data portion, and the like. Combinations of the above (series, combinations, timing, and the like) should be included within the scope of selecting a data indicator.

The various data components may be stored in the computer readable medium 112 or the near field communication tag memory 122 depending on the size and type of the data component. For example, larger files may be stored in the computer readable medium 112, whereas smaller data files, such as credit card numbers, entry codes, and the like, may be stored in the near field communication tag memory 122. In another example, the user and/or flash drive manufacturer may partition the non-volatile memories 112, 122 into one or more data partitions. In this manner, all data stored in the partition may be transmitted if that particular data partition is selected. It is to be appreciated that any other suitable indication of the selected data portion may be appropriate.

In a specific example, the user may associate a personal information data file with a particular data indicator of the memory device 10. In this manner, the user may active the data indicator in an appropriate manner (e.g., sequence, combination, and/or timing) to select the personal information data file and then activate the transmission initiation selector to transmit the personal information, such as an vCard, to the external device. In one example the transmission initiation selector 134 and the data indicator selector 136 may be integrated into a single selector 138 as shown in FIG. 2. In this manner, a user may indicate initiation of transmission of a first data portion with a first activation of a first data select/transmit selector 138, and may indicate initiation of transmission of a second data portion with a second activation of a second data select/transmit selector 138.

Figure 3:
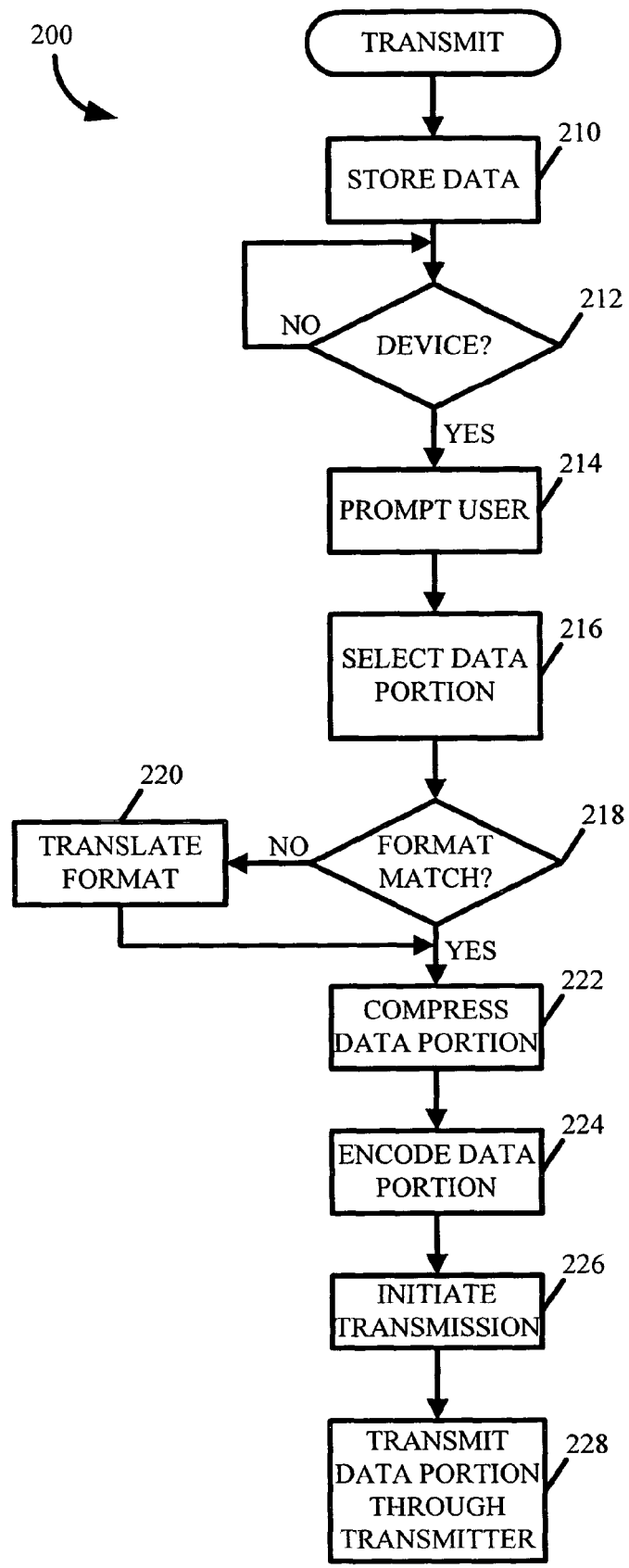
FIG. 3 is a flow chart of an example method of transmitting data using the memory device of FIG. 2 in accordance with the claims.

One example method 200 of transmitting data from a memory device to an external device is illustrated in FIG. 3 with reference to the example memory device of FIG. 2. Although the following example refers to the transponder 124, it should be understood that the memory device 10 may be provided with a transmitter alone in place of the transponder 124. As a result, a near field communication transmitter, such as the transmitter 126 of FIG. 1, may perform the function of the transponder 124.

Initially, data is stored at block 210 in the nonvolatile computer readable medium and/or the near field communication tag memory of the memory device 10 shown in FIG. 2. For wireless near field communications, e.g., with an external near field communication device, the memory device 10 will generally be in proximity with a near field communication receiver/reader of external near field communication device. When the memory device 10 is placed in proximity with the external near field communication receiver/reader, the receiver/reader may generate a magnetic field or electric field. The field generated may depend on whether the near field communication tag 24 is inductive (magnetic) or capacitively coupled (electric). In some cases, the magnetic or electric field provides power to the transponder 124. The near field communication transponder 124 may detect the generated field at block 212. If the memory device 10 is close enough to the external receiver/reader, which may be determined by the strength of the field, the memory device 10 may prompt the user for a data selection at block 214. The prompt may include a sound, activation of a light emitting diode, or the like.

The data portion to be transmitted may be selected at block 216. For example, as noted above with reference to FIG. 2, the user may select a data portion to transmit through a data indicator 136, through one or more selectors 132 or via other data entry devices described above. The data portion to be transmitted may be any portion or combination of a memory partition and/or file, executable, and the like. Because near field communications may use a different data format, e.g., tag memory format, than the computer readable medium 112, e.g., data block format, the transponder 124 may translate the data accordingly. For example, if the external device is a near field communication device and the data is stored in data block format, as determined at block 218, the transponder 124 may translate the data from data block format to tag memory format at block 220. If the external device is compatible with data block format, or if the data is already stored in tag memory format, the method 200 may proceed without the translation of block 220.

The controller 110 may compress the selected data portion at block 222. The controller 110 and/or transponder 124 may encode the data portion onto a modulated data signal at block 224. The user may then initiate transmission of the selected data portion at block 226, such as through a transmission initiation selector 134 of the memory device 10. The near field communication transponder 124 may transmit the data portion at block 228, and the external device 150 may receive the data portion.

Figure 4:
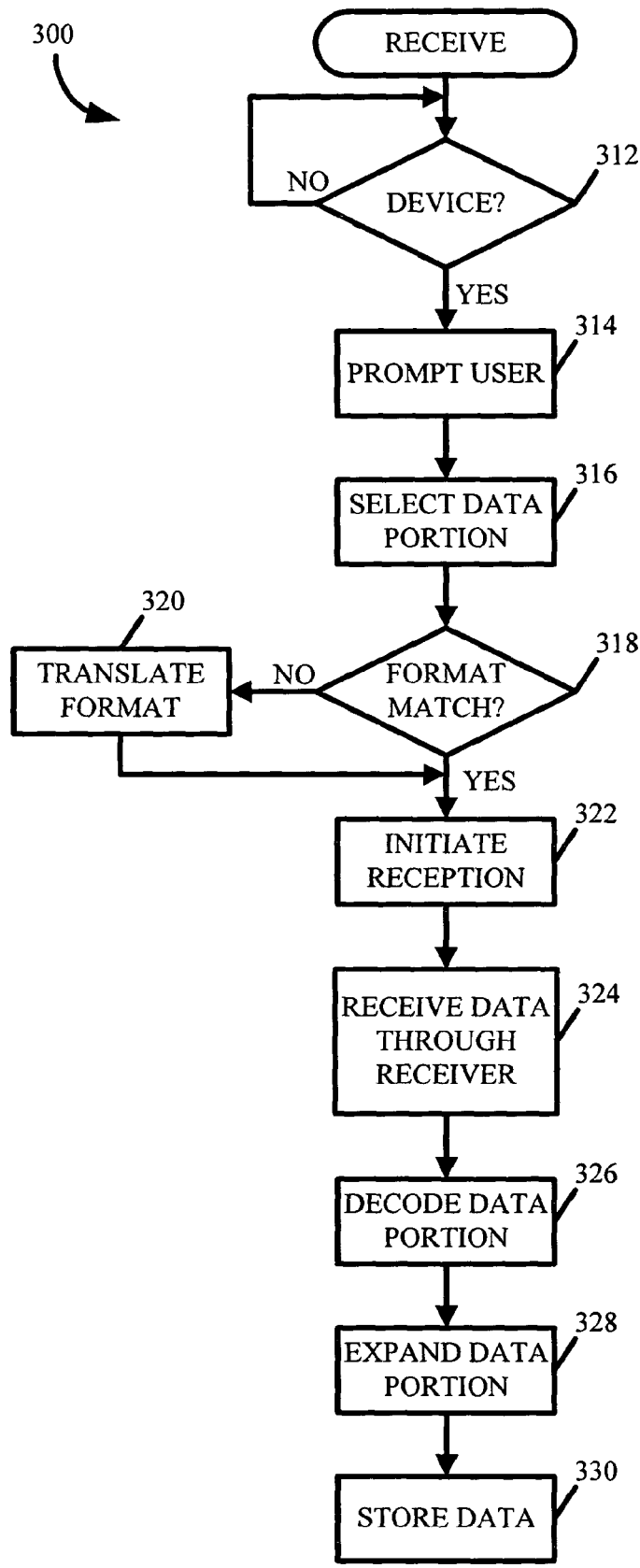
FIG. 4 is a flow chart of an example method of receiving data using the memory device of FIG. 2 in accordance with the claims.

To accept a data transmission from an external device 150, the memory device 10 may include a near field communication receiver 128 which may be integrated into the transponder 124, as shown in FIG. 2. One example method 300 of receiving data from as memory device to an external device is illustrated in FIG. 4 with reference to the example memory device of FIG. 2. Initially, the memory device 10 is placed in proximity with an external near field communication transmitter/writer. The external transmitter/writer may generate a magnetic field or electric field, which is detected by the near field communication transponder 124 at block 312. If the memory device 10 is close enough to the external receiver/ reader, the memory device 10 may prompt the user for a data selection at block 314, e.g., sound, LED, or the like.

The data portion to be received may be indicated at block 316. For example, the user may select a data portion to signify the data component being received, e.g., a person's vCard. The data component may then be stored accordingly in the appropriate data portion. The user may indicate the data component to receive through a data indicator 136, through one or more selectors 132 or via other data entry devices-described above. As mentioned above, the near field communications may use a different data format than the computer readable medium. As such, the method 300 may determine whether translation is appropriate at block 318, and the transponder 124 may translate the data accordingly at block 320.

Reception of the data may be initiated at block 322, and the near field communication transponder 124 may receive the data at block 324, and the external device 150 may receive the data portion. The transponder 124 may receive encoded and/or compressed data. For example, the transponder 124 may receive the transmitted data from the external device 150 in an encoded and/or compressed format, e.g., compressed by any suitable method to decrease the amount of memory and/or bandwidth. Data encoded on a modulated signal may be decoded by the transponder 124 at block 326. Compressed data may be expanded by the controller 110 at block 328 by any suitable method to allow the data to be used and/or accessed for its intended purpose or function. The expanded data may be stored at block 330.

Figure 5:
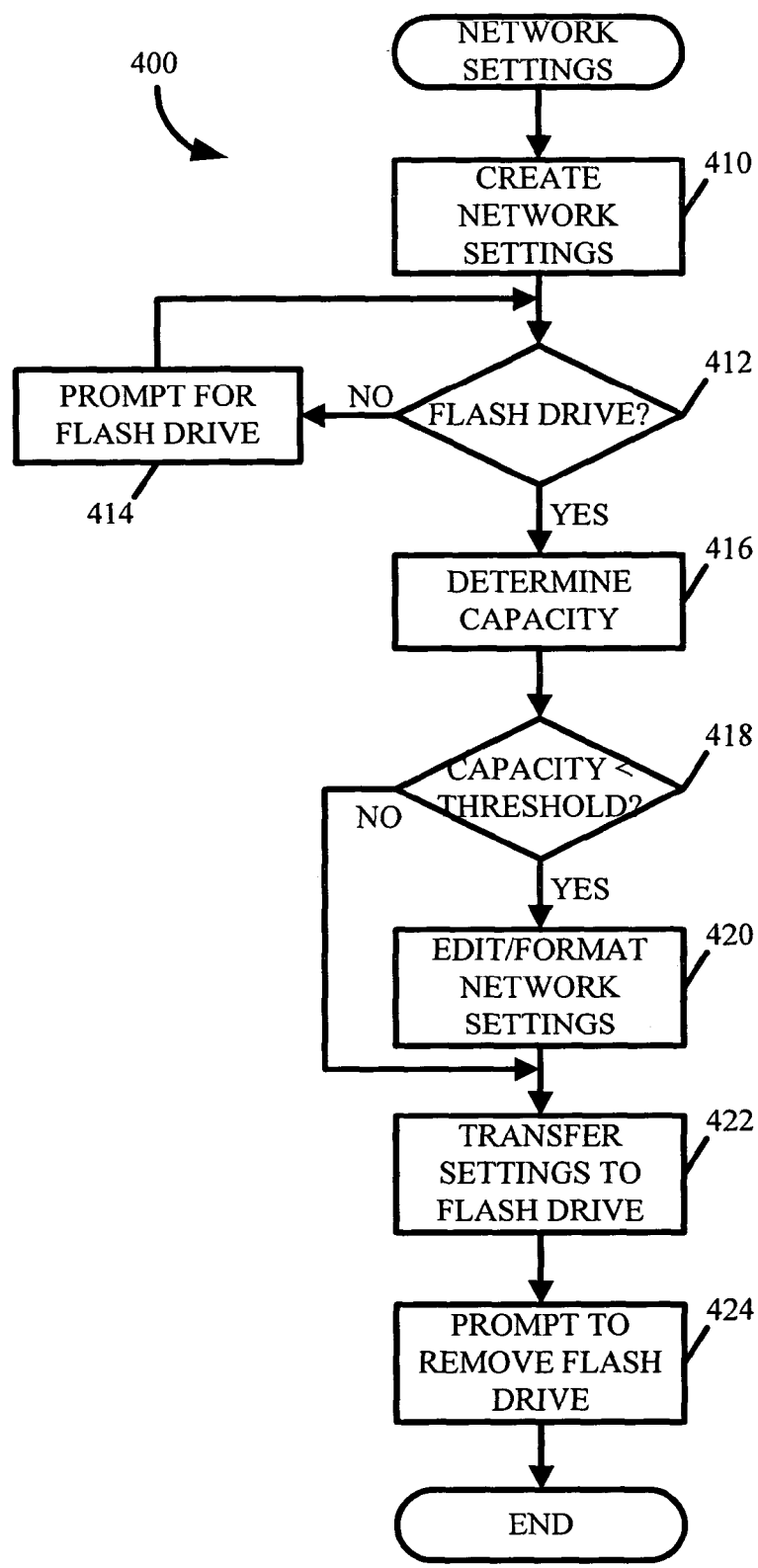
FIG. 5 is a flow chart of an example method of creating and transferring wireless network settings to the memory device of FIG. 2 in accordance with the claims.
Figure 6:
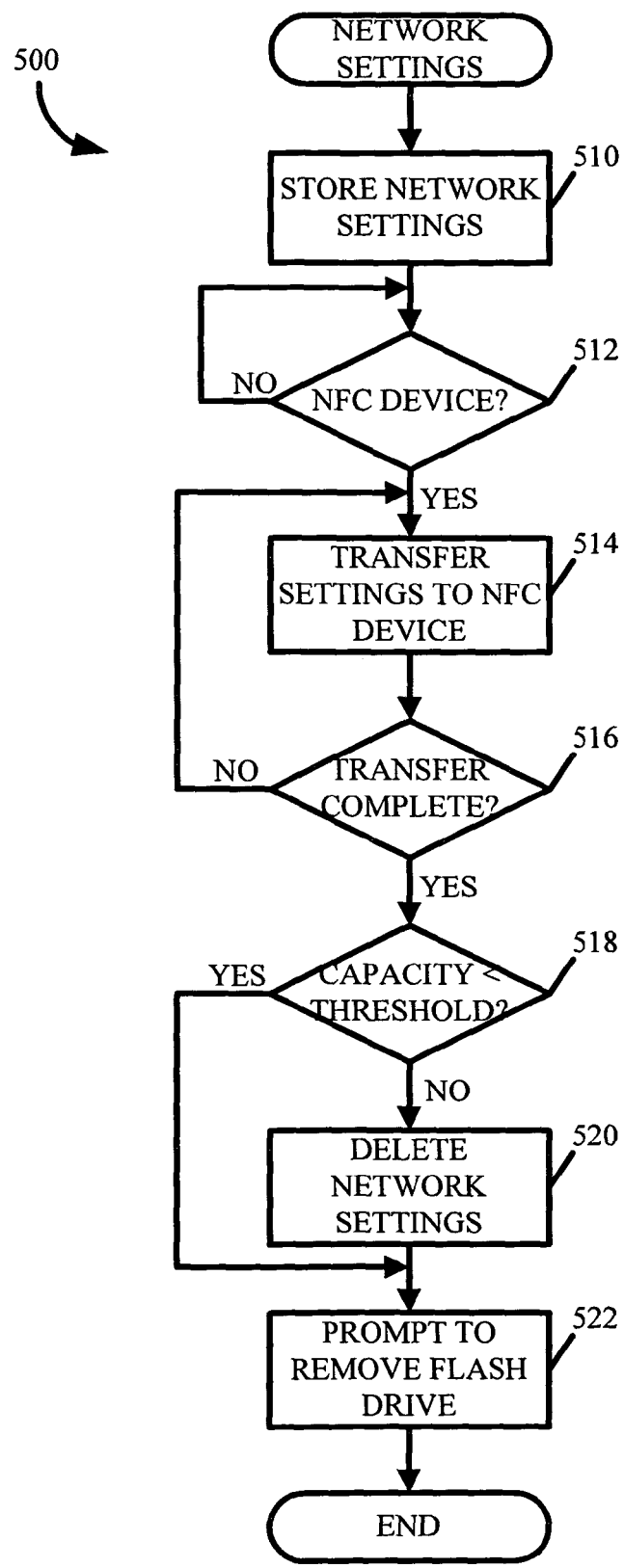
FIG. 6 is a flow chart of an example method of sharing wireless network settings with an external device in accordance with the claims.

Although various data components have been described herein, in a specific example, a user may wish to transfer her wireless settings to another user or device wishing to use the wireless network. Using a host computer system, the user may select the wireless setting data partition and activate the transmission initiation selector of the memory device 10 to transfer those settings to another user or device within the network. One example method of transferring wireless network settings is illustrated in FIGS. 5 and 6 with reference to the example memory device of FIG. 2. Referring to the method 400 of FIG. 5, the user may initially establish the wireless network settings on the host computer 102 at block 410. The host computer 102 may detect the presence of a memory device at block 412, either by presence of a memory device coupled to the USB port 104 or via proximity to the host computer 102, if the host computer 102 include wireless near field communication capabilities. If a memory device is not present, the user may be prompted for a memory device, such as the memory device 10 of FIG. 2, at block 414.

Upon detecting the memory device 10, the host computer 102 may determine the capacity of the computer readable medium 112 at block 416. Depending on the capacity of the computer readable medium 112, the host computer 102 may edit/format the network settings. In particular, if the capacity of the computer readable medium is below a particular threshold, as determined at block 418, the method 400 may edit and/or format the network settings. For example, if the capacity is 100 kilobytes or less, the method 400 may edit and eliminate optional components within the network settings. If the capacity is below another threshold, e.g., 256 kilobytes, the host computer 102 may reformat the settings, but maintain some or all of the optional components. Initially, the network settings may be created in an extensible markup language (XML) format. If formatting is appropriate, the network settings may be translated to a tag memory format or simple binary format. As a result, the network settings may be edited/formatted as appropriate based on the capacity of the computer readable medium 112. Although the host computer 102 may perform the editing/formatting, alternatively the memory device 1I may first receive the network settings and determine whether to edit/format the settings and perform editing and formatting accordingly.

Once the network settings have been edited, or if the capacity of the computer readable medium 112 exceeds the threshold value(s), the wireless network settings may be transferred to the memory device 10 at block 422, either via the method 300 of FIG. 4, or via the USB interface 108 and USB connector 106. Upon transferring the network settings, the user may be prompted to remove or otherwise decouple the memory device 10 from the host computer 102 at block 424.

Referring to FIG. 6, in order the share the network settings with another user or another device, the memory device 10 initially stores the wireless network settings in the computer readable medium 112 at block 510. The user may place the memory device 10 in proximity with a near field communication reader/receiver of an external device 150. Upon detecting the presence of a near field communication capable device at block 512, e.g., by detecting a field emitted by the reader/receiver, the memory device 10 may transfer the network settings to the external device 150 at block 514, in accordance with the method 200 of FIG. 3.

Once the transfer is complete, as determined at block 516, the method 500 may delete or maintain the wireless network settings on the computer readable medium 112, as determined at block 518. For example, if the capacity of the computer readable medium 112 is below a particular threshold, such as 100 kilobytes, the memory device 10 may permanently retain the network settings on the assumption that the memory device 10 is only used to share the network settings with other users or devices. On the other hand, the capacity is above the threshold, the memory device 10 may delete the network settings at block 520 to prevent accidental transmission with other devices. Upon transferring the network settings, the user may be prompted to remove or otherwise decouple the memory device 10 from the external device 150 at block 522.

Further example methods of transferring wireless setting data is further described in U.S. Application No. 60/534,795 filed Jan. 7, 2004, Ser. No. 10/807,095 filed Mar. 23, 2004; and Ser. No. 10/866,336 filed Mar. 23, 2004, all assigned to Microsoft. Corp. and incorporated by reference herein.

As noted above, the nonvolatile computer readable medium 112 may be partitioned into at least a first and second partition. In some cases, it may be suitable to protect information from public access, and as such, one or more partitions may be indicated as public and one or more other partitions may be indicated as private. As shown in FIG. 2, flash memory 114 may be partitioned into a public partition 160 and a private and protected partition 162. Likewise, the near field communication tag memory 122 may be partitioned into a public partition 164 and a private and protected partition 166. The public partition may be accessible as typical flash memory of a USB flash drive or as a typical tag memory of a near field communication tag. However, the private partition may be hidden, e.g., not exposed, and/or encrypted to protect the data stored in the private partition from unauthorized access. Accordingly, to access the data stored in the private partition, an authentic credential must be presented. A credential may be any suitable combination of a password, fingerprint, radio frequency identifier, written signature, voice signature, cryptographic key, retina, facial features, physical key, and the like. The credential may be presented to the USB device through any suitable method.

For example, the host computer 102 may present a user interface to the user through a display of the host computer. In this manner, the user may input a password through the keyboard of the host computer system, write a signature with a digital pen on a suitable tablet device, speak any word or a predetermined password into a microphone, and the like. In another example, the host computer system 102 shown in FIG. 2 may automatically provide a previously stored credential if provided by the user to allow a user automatic access to the private partition when the memory device 10 is connected to a pre-approved host computer system with a stored credential.

In another example, the user may present the credential through one or more selectors 132 of the memory device 10, shown in FIG. 2. Similar to the various series, combinations, and/or timing of selectors discussed above with reference to data portion selection, a user may present the credential to the memory device 10 through a predetermined series, combination, and/or timing of activation of one or more selectors 132. In another example, the memory device 10 may provide one or more key selectors 140 specifically adapted to receive a credential. In one example, the key selector 140 may include a biometric reader 26 such as a fingerprint sensor detecting a fingerprint of a finger placed proximate the biometric device or a retina sensor detecting a retina. In another example, the key selector 140 may include an alpha-numeric key pad or nay other suitable selector which may also be used to indicate a selected data portion.

The credential, after being received, may be authenticated in any suitable manner such as by comparing the received credential with a basis credential. The basis credential may be pre-stored on a trusted host computer system. Additionally and/or alternatively, the basis credential may be stored on the memory device 10. The basis credential may be stored on the memory device 10 in any suitable manner, such as part of the firmware 120, in the nonvolatile computer readable medium 112, e.g., in the private partition 162, and/or in the nonvolatile near field communication tag memory 122, e.g., in the private partition 166.

A decision component 142 may compare the received credential with the basis credential and may be supported by any suitable computing device. The decision component 142 may be described in the general context of computer-executable instructions, such as program modules, being executed by a processor. Generally, program modules include routines, programs, objects, components, data structures, etc. that perform particular tasks or implement particular abstract data types. For example, the decision component may be provided by a host computer system 102 attached to the memory device 10 through the USB connector 106. The decision component 142 may be part of the USB driver or any other component supported by the host computer system. For example in operation, the host computer system 102 may provide a user interface to accept the credential input by the user and/or receive the credential from the memory device 10. The host computer system 102 may communicate the input credential to the decision component for authentication. The decision component may access the basis credential, stored in any suitable manner, and compare the received credential with the stored basis credential. Upon authentication of the credential, the host computer system may provide a user interface to allow the user to access the data stored in the private partition.

Additionally and/or alternatively, the decision component may be supported by the memory device 10. For example, as shown in FIG. 2, the memory device 10 may include a decision component 142 accessed by the controller 110. In this manner, the memory device 10 may authenticate the received-credential. For example, the user may input a credential, such as through one or more selectors 132 and/or received from the host computer 102. The controller 110 may communicate the received credential to the decision component 142. In response to the received credential, the decision component 142 may access a stored basis credential and compare the basis and received credentials. Upon authentication of the credential, the controller 110 in communication with the decision-component 142 of the memory device 10 may allow access to the data stored in the private partition 162 of the nonvolatile computer readable medium and/or the private partition 166 of the tag memory 122. For example, the controller 110 may expose and/or decrypt the data stored in the private partition 162, 166.

In some cases, the credential allowing access to the private partition 162, 166 may include completion of some action and/or operation by the user. For example, to access the private partition 162, 166, the user may be required to review and/or access a predetermined data file such as rules regarding use of the information stored in the private partition 162, 166, advertisements, and the like. More particularly, the user may be presented with advertisements of products and/or services which are provided by advertisers. The advertisement review may be required for credential authentication each time a credential is provided; at the beginning of a time period, e.g., daily, weekly, and the like; and/or the first time a user requests access to the private partition. The advertisements or other data may be stored on the memory device 10 as appropriate, such as in the firmware 120 and/or the nonvolatile computer readable medium 112.

After the required action such as review of an advertisement is completed, the memory device 10 may delete the data providing the action/operation as appropriate. For example, if the user is required to review one or more advertisements only the first time the private partition is accessed, the memory device 10 may delete the advertisement from the nonvolatile computer readable medium 112 or allow the user to overwrite the memory location, to allow the user to use that memory for their directed purpose. Alternatively, the memory device 10 may 'burn a fuse' to that portion of memory storing the data supporting the required action. For example, memory can be read using a low voltage across a physical bridge. The 'read only' bridge may be 'broken' or burned like a fuse by applying a higher voltage. In another example, the controller 110 and its associated memory may include a virtual or physical switch which may be flipped to deny access to the memory location. In this manner, a virtual fuse, or access to the private partition, may be burned.

As noted above, a decision component, such as the decision component 142 shown in FIG. 2, may attempt to authenticate the received credential. If the decision component determines that the received credential is not authentic, the memory device 10 may deny access to the private partition 162 of the computer readable medium 112 or the private partition 166 of the tag memory 122. Access may be denied by maintaining the hidden and/or encrypted status of the data stored in the private partition 162, 166. In some cases, the memory device 10 may not only deny access, but also remove access to the data of the private partition 162, 166 by 'burning a fuse' to the data as described above. After the fuse is burned, a user may not access the data in the private partition 162, 166, even if an authentic credential is subsequently provided to the memory device 10; however in some cases, an authorized dealer may be able to access and/or retrieve data stored in the private partition 162, 166 if the user presents suitable credentials.

The decision component 142 may receive a second credential, e.g., a second try by the user to fulfill the credential requirement. However, the decision component 142 may refuse to authenticate a received credential, such as if the user submits a predetermined number of inauthentic credentials. For example, the controller 110 may maintain a credential attempt count. After a predetermined number of inauthentic credentials, the memory device 10 may deny access to the private partition 162, 166 in any suitable manner.

The memory device 10 may request a credential to access the private partition 162, 166 from time to time or after a predetermined event. For example, to maintain access to the private partition 162, 166, the controller 110 may require the user to re-present a credential after a predetermined amount of time has passed, whenever there is a power cycle to the memory device 10, whenever the host computer system 102 engages a screen saver, whenever the host computer system 102 is put to 'sleep' or 'placed on standby', whenever the user logs off the host computer system 102, or any other suitable event. In another example, the memory device 10 may include one or more selectors 132, such as a lock selector 144, which when activated may lock the private partition 162, 166 such that an authentic credential must be presented before further access is allowed. Accordingly, to access the private partition 162, 166 after the predetermined time and/or event, the user may be required to present a credential to be re-authenticated; such as by the decision component 142.

Figure 7:
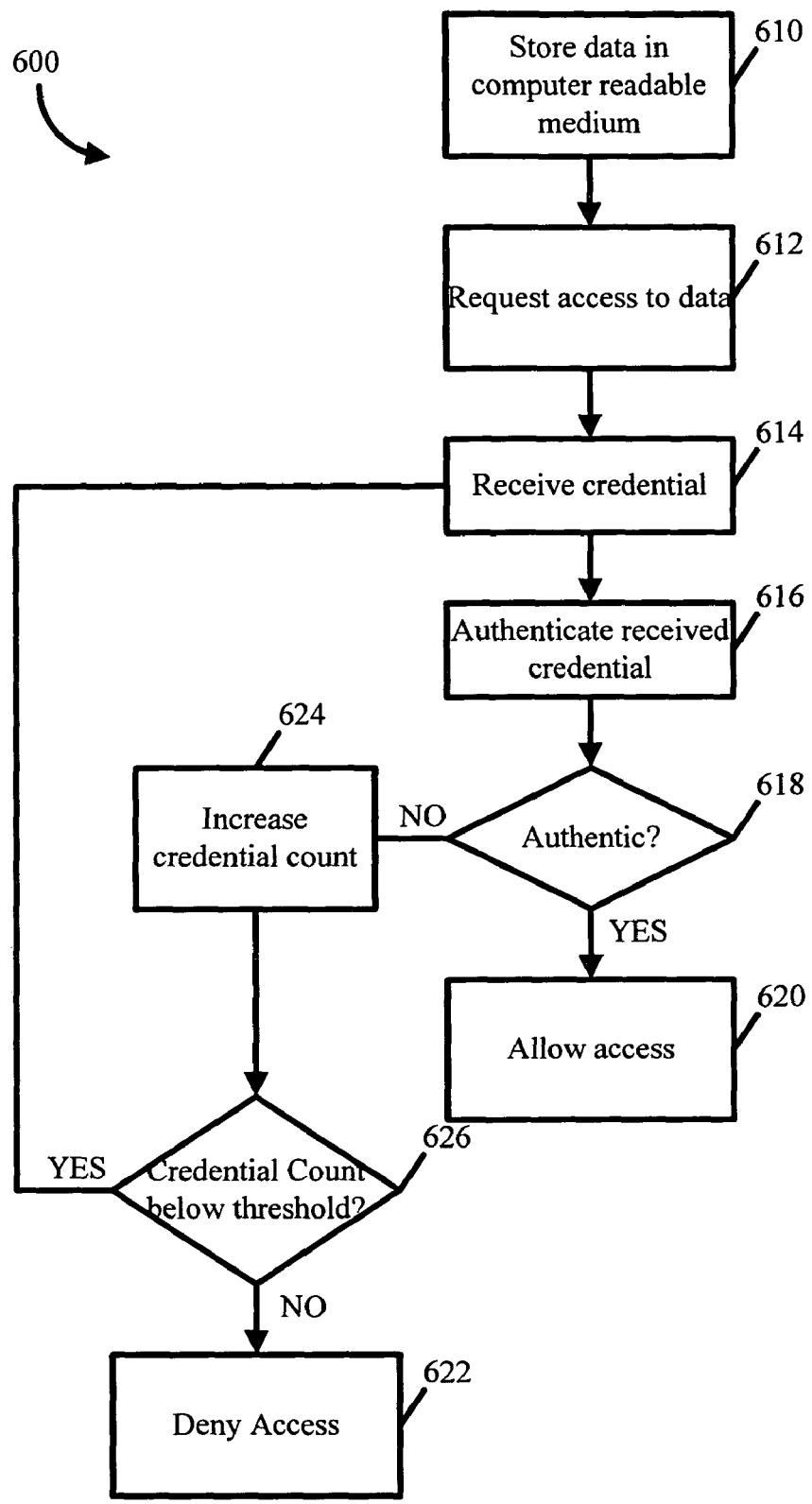
FIG. 7 is a flow chart of an example method of implementing credential authentication in accordance with the claims.

One example method 600 of authenticating a credential in a memory device 10 is illustrated in FIG. 7 with reference to the example memory device 10 of FIG. 2. Initially, data is stored 610 in a private partition 162 of the nonvolatile computer readable medium 112 and/or the private partition 166 of the tag memory 122 of the memory device 10 shown in FIG. 2. The private partition 162, 166 may be any portion of the computer readable medium 112 or the tag memory 122, such as a predetermined amount of memory storage, one or more particular files and/or documents, all of the available memory storage of the computer readable medium 112, all of the available memory storage of the tag memory 122, and any other suitable portion. The user may request data stored in the private partition 162, 166 at block 612. For example, the user may select a 'view private partition' selector and in response, a user interface dialog may request a credential from the user. In another example, presentation of a credential may automatically request access to the private partition. In either case, the user may present a credential, which is received at block 614 by host computer 102 and/or memory device 10, as noted above. The credential may then be authenticated at block 616, such as by a decision component of the host computer system 102 and/or the memory device 10. If the credential is authenticated at block 618, access to the private partition 162, 166 may be allowed at block 620, such as by exposing and/or decrypting the data stored in the private partition 162, 166. If the credential is not authentic, the user may be able to present an additional credential to be authenticated. In this case, the credential attempt count may be increased at block 624, such as by the host computer system 102 and/or memory device controller 110. The credential attempt count may then be compared at block 626 to a predetermined value to determine if further action should be taken. For example, if the credential attempt count is below a predetermined value, further credentials may be received and authenticated. However, if the credential attempt count exceeds or equals a predetermined value, further attempts to authenticate a credential maybe denied at block 622. Access to the private partition 162, 166 may be denied by maintaining hiding or encryption of the private partition 162, 166, burning a fuse to the private partition 162, 166, refusing to receive and/or authenticate additional credentials, and/or in any other suitable manner. In some cases, denial of receiving credentials to be authenticated may be maintained until a predetermined event occurs. For example, the predetermined event may be the expiration of a period of time, the memory device 10 is connected to a predetermined host computer system 102, the memory device 10 is released by an authorized dealer, or any other suitable event.

As noted above, a memory device may typically derives power for operation through the direct physical attachment of the USB connector 106 to the USB port 104 of the host computer system 102. Further, a memory device may derive power from a magnetic or electric field generated by a near field communication reader/receiver. To allow the memory device 10 to function, such as to transfer data, separated from a host computer system 102, the memory device 10 may include a power supply 146, independent of the USB connector 106 or external reader/receiver 150, to provide power to one or more components of the memory device 10. For example, as shown in FIG. 2, the power supply 146 may provide power to the controller 110, the computer readable medium 112 the near field communication tag 24, the selectors 132, firmware 120, and/or the decision component 142. Any suitable power supply 146 may be used as appropriate in the memory device 10 including any combination of a battery, a solar power system, a piezoelectric system, and the like. For example, the memory device 10 may include a power supply 146 including a battery which may be recharged from time to time by power derived from host computer system 102 through the USB connector and/or a solar power supply such as solar cells. In this manner, the memory device 10 may derive power from the host computer 102 when the USB connector is physically attached to the USB port and may also operate separated from the host computer 102. Accordingly, the memory device 10 may transmit data from the nonvolatile computer medium 112 to an external device without a host computer system attachment. Similarly, the memory device 10 may receive and authenticate a credential to access a private partition 162, 166 without a direct attachment to a host computer system. Similarly, any memory device may provide its intended function and/or operation without a physical attachment to a host computer system.

Figure 8:
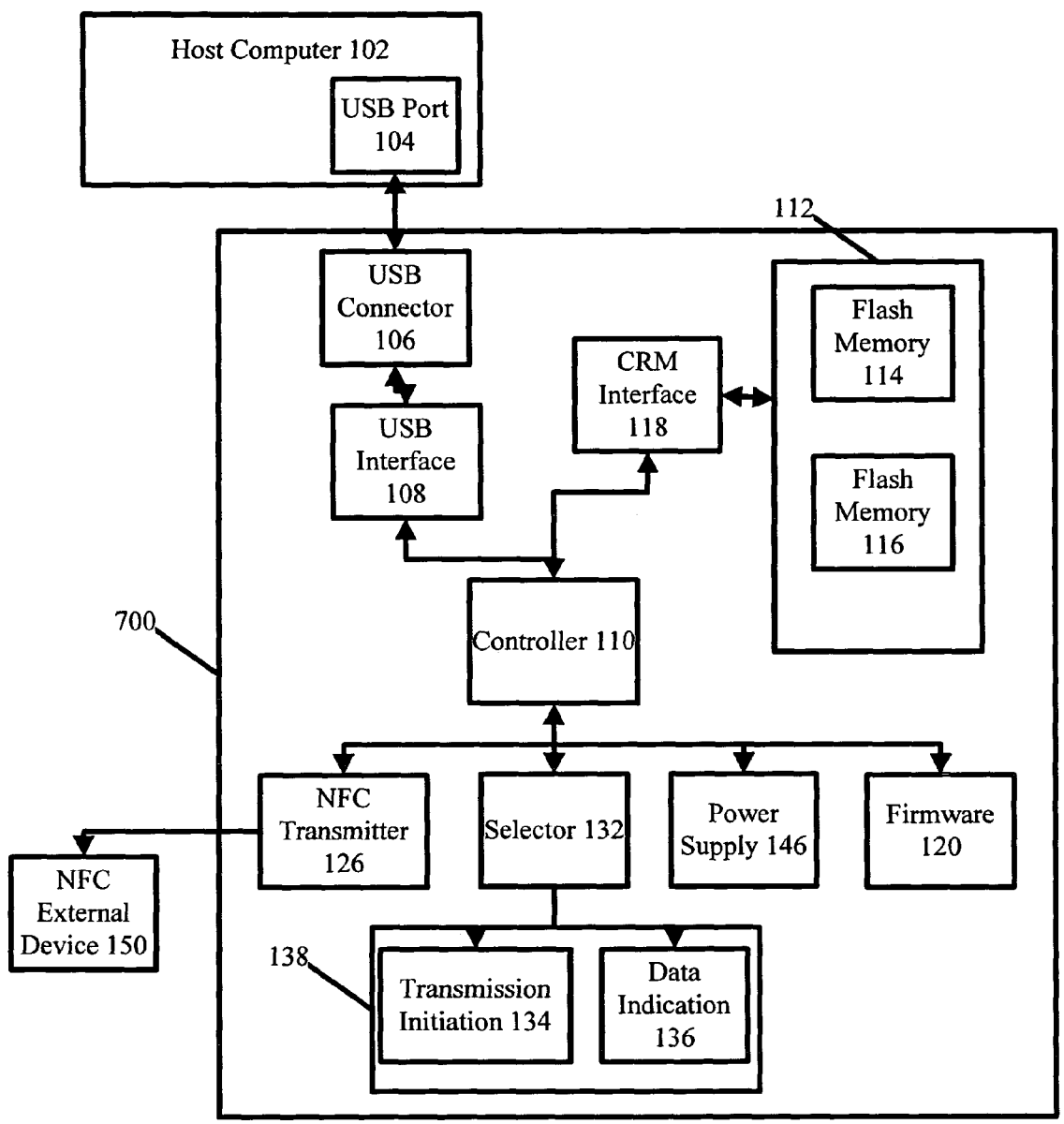
FIG. 8 is a schematic illustration of an example memory device in accordance with the claims.

FIGS. 8-11 illustrate various combinations of the elements described above, where like reference numbers represent like elements. For example, FIG. 8 illustrates a memory device 700. The memory device 700 may include a USB connector 106 connectable with a USB port of a host computer system 104, a controller 110, firmware 120, a USB interface 108, and a computer readable medium interface 118. The memory device 700 may also include a nonvolatile computer readable medium 112 which may include one or more flash memories 114, 116. The memory device 700 may include a near field communication wireless transmitter 126 which may transmit data from the computer readable medium 112 to an external near field communication wireless device 150. The data may be transmitted by the transmitter directly, compressed, wirelessly, and/or over a modulated data signal designed to encode digital information. The memory device 700 may also include one or more selectors 132 which may include a transmission initiation selector 134 and/or a data indicator 136. The memory device 700 may include a power supply 146 providing power to one or more components of the memory device 700. In this manner, a user may receive a data transfer and store the received data in the memory device 700 without requiring a connection of the USB connector 106 to the USB port 104.

Figure 9:
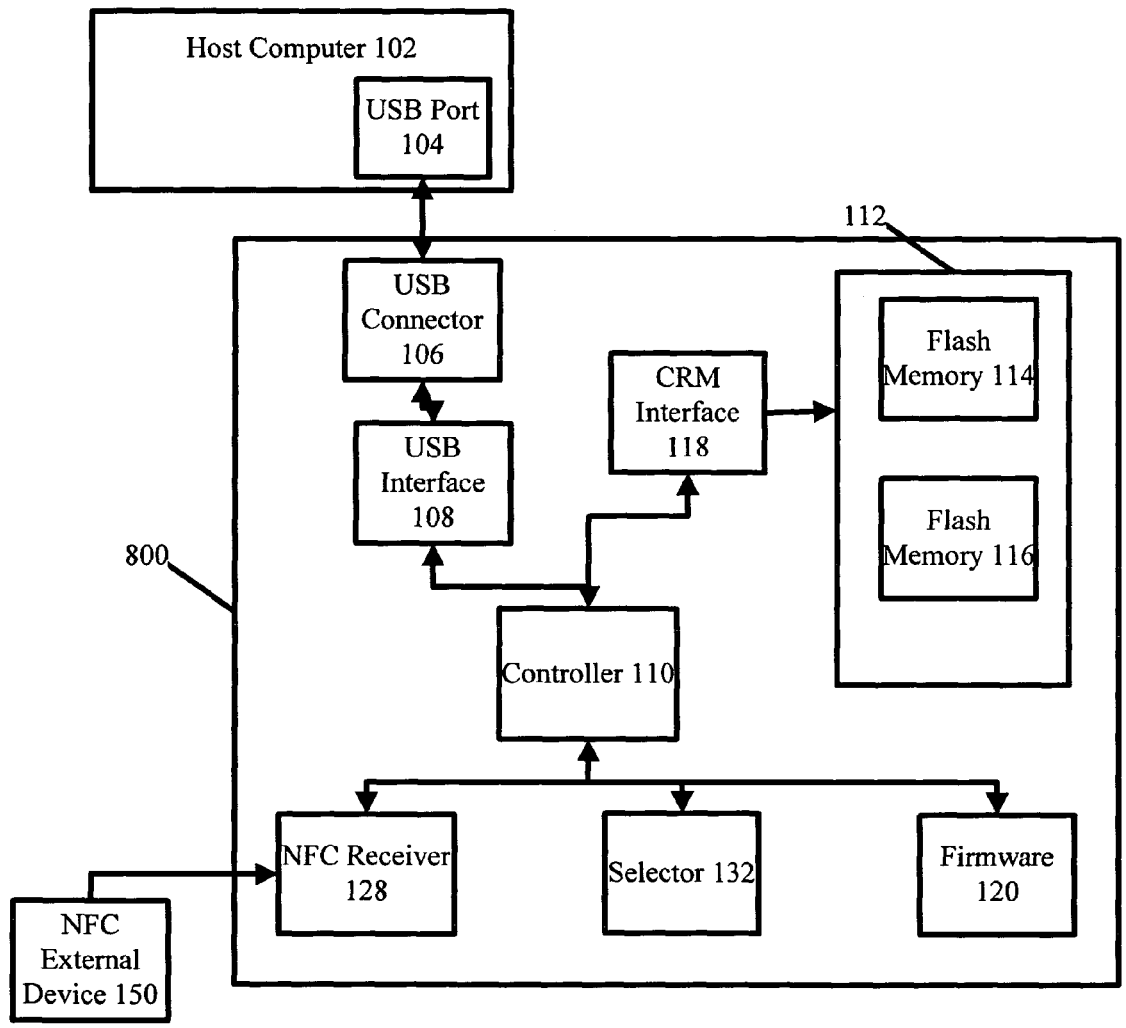
FIG. 9 is a schematic illustration of another example memory device in accordance with the claims.

FIG. 9 illustrates a memory device 800. The memory device 800 may include a USB connector 106 connectable with a USB port of a host computer system 104, a controller 110, firmware 120, a USB interface 108, and a computer readable medium interface 118. The memory device 800 may also include a nonvolatile computer readable medium 112 which may include one or more flash memories 114, 116. The memory device 800 may include a near field communication wireless receiver 128 which may receive data from an external near field communication wireless device 150 apart from the USB connector 106. The data may be received by the receiver 128 directly compressed, wirelessly, and/or over a modulated data signal designed to encode digital information. The memory device 800 may also include one or more selectors 132.

Figure 10:
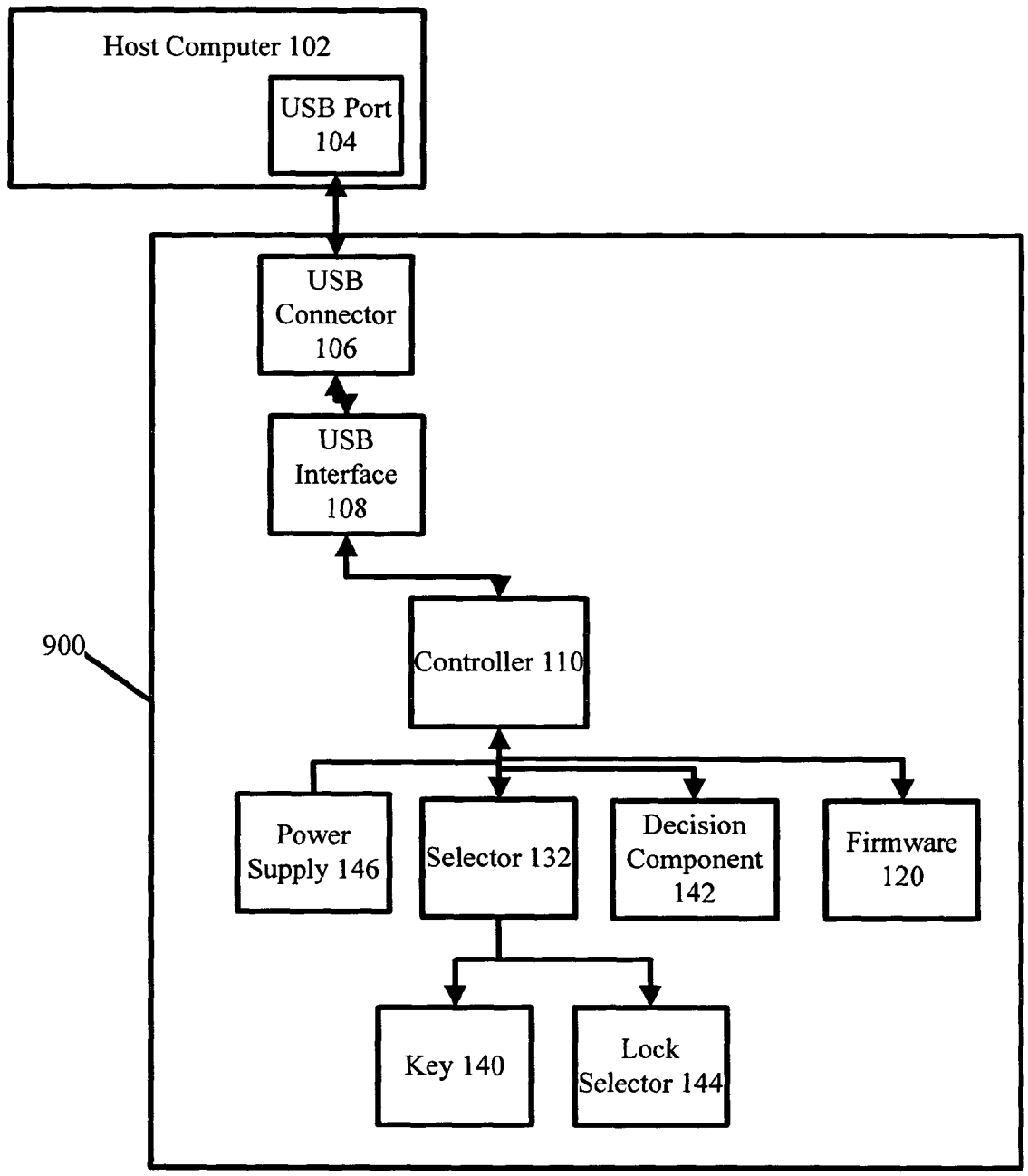
FIG. 10 is a schematic illustration of an example memory device in accordance with the claims.

FIG. 10 illustrates a device 900 which may be any type of USB compatible device such as a consumer electronic device, a printer, a scanner, a memory device, and the like. The device 900 may include a USB connector 106 connectable with a USB port of a host computer system 104, a controller 110, firmware 120, and a USB interface 108. The device 900 may include one or more selectors 132 such as keys 140, which may allow a user to present a credential such as a password or other credential to the device 900 without having to interface through the host computer system 102. The received credential may be authenticated by the decision component 142 of the device 900. If the credential is authenticated, a function and/or operation of the device 900 may be allowed. For example, memory may be accessed, memory read and/or write privileges may be granted, printer functions may be accessed, and/or the like. The device 900 may also include a lock selector 144 which allows a user to reset a lock, requiring a user to re-present a valid credential to access the locked function and/or operation. The device 900 may include a power supply 146 providing power to one or more components of the device 900. In this manner, a user may provide a credential, authenticate a credential, and/or provide a function and/or operation of the device 900 without requiring a connection of the USB connector 106 to the USB port 104 of a host computer-system 102.

Figure 11:
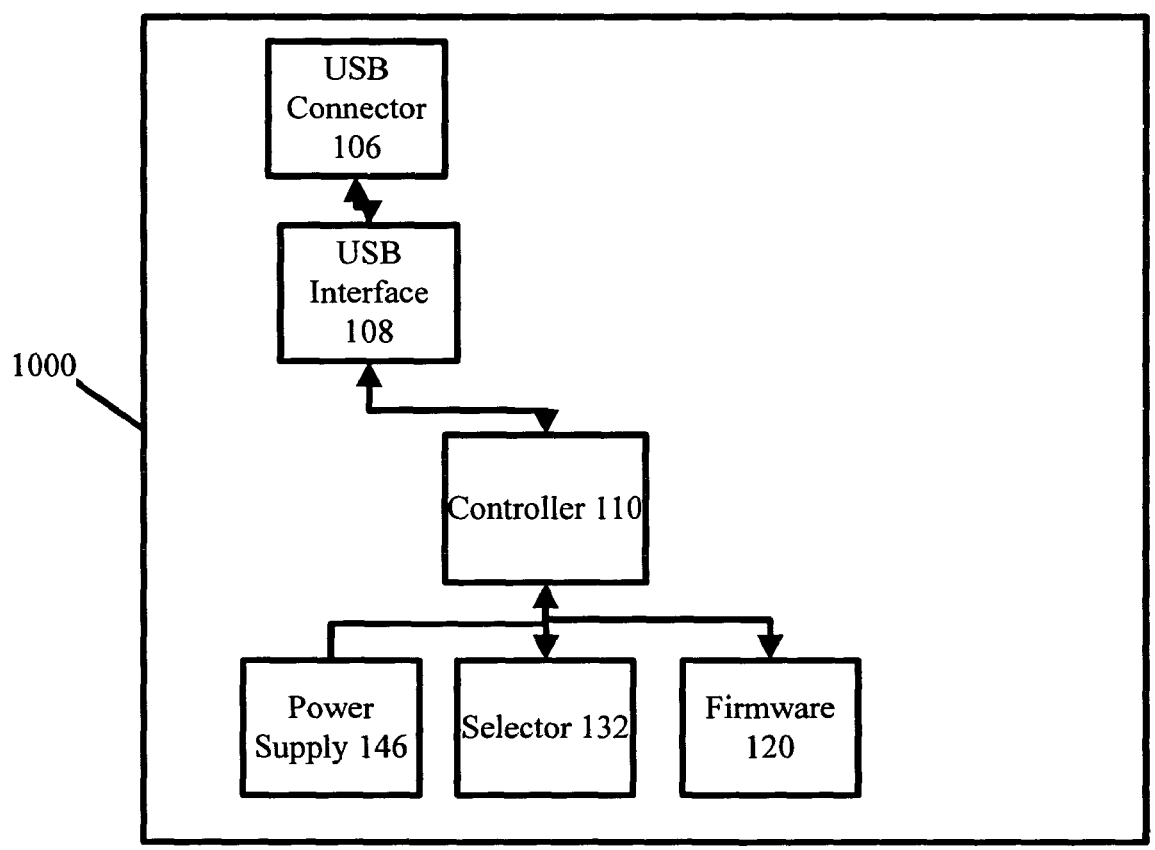
FIG. 11 is a schematic illustration of another example memory device in accordance with the claims.

FIG. 11 illustrates a device 1000 which may be any type of USB compatible, device such as a consumer electronic device, a printer, a scanner, a memory device, and the like. The device 1000 may include a USB connector 106 connectable with a USB port of a host computer system 104, a controller 110, firmware 120, and a USB interface 108. The device 1000 may include one or more selectors 130. The device 1000 may include a power supply 146 providing power to one or more components of the device 1000. In this manner, the device 1000 may provide a function and/or an operation of the device 1000 without requiring a connection of the USB connector 106 to the USB port 104 of a host computer system 102. In one example, the power supply 146 may be charged with power received through a connection of the USB connector 106 with a USB port 104 of a host computer system 102.

Devices 900, 1000 may include a variety of computer readable media. Computer readable media can be any available media that can be accessed by a controller of the device and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the controller of the device.

The drives and their associated computer storage media discussed above and illustrated in FIGS. 2, 8, 9, 10 and 11 provide storage of computer readable instructions data structures, program modules and other data for the device.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated-herein without departing from the spirit and scope of the present claims. Accordingly, it should be understood that the methods and apparatus described herein are illustrative only and are not limiting upon the scope of the claims.

The invention claimed is:

1. A memory device comprising:
   a nonvolatile computer readable medium adapted to store data in a data block format;
   a near field communication wireless transponder comprising a near field communication wireless receiver adapted to wirelessly receive wireless network settings from a first external near field communication transmitter of a first device external to the memory device when communication is established between the memory device and the first device, wherein the wireless network settings are stored on the nonvolatile computer readable medium, and a near field communication wireless transmitter operatively coupled to the nonvolatile computer readable medium and adapted to wirelessly transmit wireless network settings to a second external near field communication receiver of a second device external to the memory device when communication is established between the memory device and the second device;
   a nonvolatile near field communication tag memory adapted to store data in a tag memory format, wherein the tag memory format is incompatible with the data block format used to store data in the nonvolatile computer readable medium;
   a data input device; and
   a controller operatively coupled to the nonvolatile computer readable medium, the near, field communication transmitter, nonvolatile near field communication tag memory, and the data input device,
   wherein the near field communication wireless transponder is adapted to translate the stored data in the data block format to the tag memory format and adapted to translate received data from the tag memory format to the data block format.

2. The memory device of claim 1, wherein the controller includes a Universal Serial Bus (USB) interface, the memory device further comprising a USB connector operatively coupled to the USB interface.

3. The memory device of claim 1, wherein the near field communication receiver is adapted to translate the received data to at least one of the group consisting of the data block format and the tag memory format.

4. The memory device of claim 1, wherein the nonvolatile computer readable medium further comprises a public partition and a private partition, the memory device further comprising: a decision component for receiving at least one credential and for allowing access to the private partition if the credential is authentic.

5. The memory device of claim 1, wherein the near field communication wireless transmitter is adapted to wirelessly transmit the translated data to the external near field communication receiver.

6. The memory device of claim 1, wherein the near field communication transmitter is adapted to wirelessly transmit network settings to the external near field receiver.

7. The memory device of claim 1, wherein data is stored in the near field communication tag memory, the memory device further comprising a decision component adapted to receive at least one credential and further adapted to provide access to at least a portion of the data stored in response to a valid credential.

8. The memory device of claim 1, wherein the near field communication transmitter is adapted to wirelessly transmit data to the external near field communication receiver in response to a user input received via the data input device.

9. A method of communicating wireless network settings between a first device and a second device comprising:
   providing a USB device including a controller, a nonvolatile computer readable medium, a near field communication transponder and a nonvolatile near field communication tag memory adapted to store data in a tag memory format, wherein the tag memory format is incompatible with the format used to store data in the nonvolatile computer readable medium;
   establishing communication between the USB device and a first device external to the USB device;
   receiving wireless network settings from the first device;
   storing the wireless network settings on the nonvolatile computer readable medium;
   establishing communication with a second device comprising a near field communication receiver;
   translating the wireless network settings from the nonvolatile computer readable medium format to a tag memory format; and
   wirelessly transmitting the wireless network settings to the second device.

10. The method of claim 9,
   wherein receiving the wireless network settings from/the first device comprises receiving the wireless network settings in an extensible markup language (XML) data format from the first device,
   wherein storing the wireless network settings on the nonvolatile computer readable medium comprises storing the wireless network settings on the nonvolatile computer readable medium in the XML format,
   wherein translating the wireless network settings comprises translating the wireless network setting from the XML format to a binary format, and
   wherein wirelessly transmitting the wireless network settings to the second device comprises wirelessly transmitting the translated wireless network settings in binary format to the second device.

11. The method of claim 9, further comprising:
   determining a capacity of the nonvolatile computer readable medium; and
   editing the wireless network settings based on the capacity of the nonvolatile computer readable medium.

12. The method of claim 9, further comprising:
   determining a capacity of the nonvolatile computer readable medium; and
   deleting the wireless network settings from the nonvolatile computer readable medium after wirelessly transmitting the wireless network settings to the second device based on the capacity of the nonvolatile computer readable medium.

13. The method of claim 9, wherein receiving the wireless network settings from the first device comprises receiving the wireless network settings from the first device via a USB connector operatively coupled to the controller.

14. The method of claim 9, further comprising:
   applying the wireless network settings at the second device;
   establishing wireless communication with a wireless network based on the wireless network settings.

15. A Universal Serial Bus (USB) flash drive comprising:
   a controller including a USB interface, a nonvolatile computer readable medium interface and a near field communication tag interface;
   a nonvolatile computer readable medium adapted to store data in a data block format;
   a near field communication wireless transponder operatively coupled to the nonvolatile computer readable medium, and comprising a near field communication wireless receiver adapted to wirelessly receive wireless network settings from a first external near field communication device external to the USB flash drive when communication is established between the USB flash drive and the first external near field communication device, wherein the wireless network settings are stored on the nonvolatile computer readable medium, and a near field communication wireless transmitter adapted to wirelessly transmit wireless network settings to a second external near field communication device external to the USB flash drive when communication is established between the USB flash drive and the second external near field communication device;
   a nonvolatile near field communication tag memory adapted to store data in a tag memory format incompatible with the data block format used to store data in the nonvolatile computer readable medium; and
   a plurality of data input devices, wherein each data input device is associated with a data component stored in at least one of the group consisting of: the nonvolatile computer readable medium and the nonvolatile near field communication tag memory
   wherein the near field communication wireless transponder is adapted to translate the stored data in the data block format to the tag memory format and adapted to translate received data from the tag memory format to the data block format.

16. The USB flash drive of claim 15, wherein the near field communication wireless transponder is adapted to wirelessly transmit a data component to the external near field communication device in response to a user input received via the data input device associated with the data component.

17. The USB flash drive of claim 15,
   wherein the near field communication wireless transponder is adapted to wirelessly receive a data component from the external near field communication device;
   wherein the near field communication wireless transponder is adapted to store the data component in at least one of the group consisting of the nonvolatile computer readable medium and the near field communication memory; and
   wherein the near field communication wireless transponder is adapted to associate the data component with at least one of the plurality of data input devices.

18. The USB flash drive of claim 15, wherein the near field communication transponder and the near field communication tag memory together comprise a Radio Frequency Identification (RFID) tag.

19. The USB flash drive of claim 15, wherein the nonvolatile computer readable medium comprises a flash memory.

* * * * *